US011594083B1

(12) United States Patent
Rosenbaum (10) Patent No.: US 11,594,083 B1
(45) Date of Patent: Feb. 28, 2023

(54) METHOD AND SYSTEM FOR DETERMINING A STATE CHANGE OF AN AUTONOMOUS DEVICE

(71) Applicant: Walter Steven Rosenbaum, Jerusalem (IL)

(72) Inventor: Walter Steven Rosenbaum, Jerusalem (IL)

( * ) Notice: Subject to any disclaimer, the term of this patent is extended or adjusted under 35 U.S.C. 154(b) by 0 days.

(21) Appl. No.: 17/554,106

(22) Filed: Dec. 17, 2021

(30) Foreign Application Priority Data

Dec. 6, 2021 (EP) .................................. 21212457

(51) Int. Cl.
*G07C 5/08* (2006.01)
*B60W 60/00* (2020.01)
*G06F 11/34* (2006.01)

(52) U.S. Cl.
CPC ......... *G07C 5/0816* (2013.01); *B60W 60/001* (2020.02); *G06F 11/3495* (2013.01); *B60W 2510/244* (2013.01)

(58) Field of Classification Search
USPC .......................................................... 701/22
See application file for complete search history.

(56) References Cited

U.S. PATENT DOCUMENTS

| 2004/0148093 | A1* | 7/2004 | Tanaka | G01C 25/00 701/400 |
| 2013/0311086 | A1* | 11/2013 | Aoki | G01C 21/32 701/446 |
| 2015/0360697 | A1 | 12/2015 | Baek et al. | |
| 2018/0154899 | A1* | 6/2018 | Tiwari | G05D 1/0217 |
| 2020/0055524 | A1 | 2/2020 | Lacaze et al. | |

FOREIGN PATENT DOCUMENTS

EP 3578433 B1 8/2020

* cited by examiner

Primary Examiner — Tyler D Paige
(74) Attorney, Agent, or Firm — Laurence A. Greenberg; Werner H. Stemer; Ralph E. Locher (57) ABSTRACT

A method and a system determine a change of state of an autonomous device, such as an autonomous vehicle. A plurality of performance parameter values obtained by monitoring at least one performance parameter during the autonomous operation of the device is received. A performance quantity quantifying the quality of autonomous operation of the device, in particular the quality of driving of the autonomous vehicle, is determined based on the obtained performance parameter values and information associated with a flux of software and/or hardware related to the autonomous operation of the device. Further, a change of state value for the device is determined based on the performance quantity.

19 Claims, 3 Drawing Sheets

METHOD AND SYSTEM FOR DETERMINING A STATE CHANGE OF AN AUTONOMOUS DEVICE

CROSS-REFERENCE TO RELATED APPLICATION

This application claims the priority, under 35 U.S.C. § 119, of European Patent Application EP 21 212 457.2, filed Dec. 6, 2021; the prior application is herewith incorporated by reference in its entirety.

FIELD AND BACKGROUND OF THE INVENTION

The present invention relates to a method and a system for determining a change of state of an autonomous device, in particular an autonomous vehicle.

Autonomously operating devices have already become part of everyday life. Such devices include, for instance, robot vacuum cleaners, smart homes, and autonomous vehicles. All these devices have in common that they operate based on highly specialized control software which is designed to process usually huge amounts of input data for controlling the behavior of the device. For example, these devices may comprise sensors for recognizing the environment. Hence, sensor data needs to be processed in order to navigate, react to and/or predict the evolution of the device's surroundings.

Such data processing is extremely complex given the number of different situations that may be encountered and the number of possible behaviors that may be adequate. Any situation which is not correctly interpreted by the software may lead to unwanted behavior or even an accident, resulting in damage to persons and costs. This not only places a huge burden on quality management, but also implies questions regarding liability issues. For example, it will be necessary to think about how devices capable of operating autonomously are insured, e.g. how insurance premiums may reflect the reliability of the autonomous device. Also, it has to be considered how the reliability of autonomously operating devices affects ancillary aspects such as part wear and its effects on inventory and supply chain, planning, part expected wear redesign, staffing levels to address false alarm rates for autonomous security devices and/or the same.

Further, in the realm of the Internet of Things (IoT) there are numerous peripheral devices that sense their environment in an intelligent manner. In a broad sense these might be referred to as autonomous as they share an important common trait—their AI control code bases are large, complex, and require frequent remote, over the air update. Also, these devices require regular evaluation to adjust and optimize mission. This, causes a dilemma: reliable extensive evaluation becomes difficult when there is code base flux due to remote updates.

The same problem exists in robotic AI controlled vehicles that are, for example, used in long duration military missions and environmental research. Their long mission period will also require frequent remote updates for code errors and/or new releases.

A further effect of the complexity of recognition and prediction performed by autonomous devices is the difficulty in assessing possible consequences of changes in the device design, be it by code changes in the software or replacement or upgrade of components or directly related code of hardware parts. For instance, it can be difficult sometimes to determine whether a certain behavior of the device is due to a particular situation or, say, a recent patch/update of the control software. Hence evaluation is usually done on a system basis using statistical testing. However, the frequency of patches/updates may interfere with conventional statistical testing methods.

SUMMARY OF THE INVENTION

It is an object of the present invention to provide an improved method and system for assessing the state of an autonomous device, in particular for quantifying the effects of code and/or hardware changes on the behavior of the device.

With the above and other objects in view there is provided, in accordance with the invention, a method and a system for determining a change of state of an autonomous device, such as an autonomous vehicle. By way of example, the method comprises the following steps:

receiving a plurality of performance parameter values obtained by monitoring at least one performance parameter during an autonomous operation of the device;

determining a performance quantity quantifying a quality of the autonomous operation of the device based on the performance parameter values and information associated with a flux of at least one of a software or a hardware related to the autonomous operation of the device; and determining a change of state value for the device based on the performance quantity.

In other words, the objects of the invention are achieved by a method and a system for determining a change of state of an autonomous device, in particular an autonomous vehicle, as claimed.

A first aspect of the invention relates to a, in particular computer implemented, method for determining a change of state of an autonomous device, in particular an autonomous vehicle. The method comprises (i) receiving a plurality of performance parameter values obtained by monitoring at least one performance parameter during autonomous operation of the device, and (ii) determining a performance quantity quantifying the quality of autonomous operation of the device, in particular the quality of driving of the autonomous vehicle, based on the obtained performance parameter values and information associated with a flux of software and/or hardware related to autonomous operation of the device due to changes in its software and/or hardware bases. Further, (iii) a change of state value for the device is determined based on the performance quantity.

An autonomous device in the sense of the present invention is preferably a device which is able to operate autonomously, i.e., at least partially independent of human control. An autonomous device may be controlled by an artificial intelligence. For example, an autonomous device is a vehicle operating at least partially autonomously. In particular, the autonomous vehicle may provide some driver assistance, which qualifies it as an autonomous vehicle.

The autonomous device preferably operates on a code base. This code may be in flux, i.e., subject to changes as for instance updates or patches, respectively, are rolled out. These changes may affect the performance of autonomously controlled actions such as braking, accelerating, swerving, and/or the like in an autonomous vehicle. Similarly, these changes may affect the state of the vehicle or at least some of its components, such as brake pad wear, clutch wear, fuel consumption, and/or similar operationally sensitive components.

An information associated with a flux of software and/or hardware related to autonomous operation of a device in the sense of the present invention is preferably an external information. I.e., this information may be obtained, e.g. received, independently of performance parameter values. In particular, it may be a statistical or deterministic information from another source. Preferably, the information associated with a flux of software and/or hardware can be an information indicative of or corresponding to a flux of software and/or hardware.

An aspect of the invention is based on the approach of evaluating performance parameter values obtained from monitoring an autonomous device, and taking into account in this evaluation a change in software and/or hardware of the device. Based on these performance parameter values and information associated with the change of the software and/or hardware, for example a signal and/or data indicative of the change, a performance quantity quantifying the quality of autonomous operation of the device can be computed more accurately and quickly. The information associated with the change may, for example, determine how the performance parameter values are processed and/or how the performance quantity is computed, in particular based on the performance parameter values. In particular, based on the information, a coefficient or other factor may be adjusted to better handle sampling and/or processing of the sampled data, e.g. the performance parameter values.

The performance quantity then allows determining a change of state value for the device. For example, based on the performance quantity it may be derived whether a change of state of the device has occurred or not. In particular, based on the performance quantity it may be derived or assessed, respectively, whether a change of the software and/or the hardware has any effect on the autonomous operation of the device or not. Advantageously, it may also be derived the magnitude of said effect is, e.g. how strong the quality of autonomous operation has improved or deteriorated.

Generally speaking, by performing measurements (receiving the performance parameter values) on any device part of an AI system (autonomous or semi-autonomous or operator assisted device), a change in its AI controlled behavior may be detected. In particular, it may be determined whether a flux in software and/or hardware positively or negatively disrupts the operation of the device.

The so-determined change of state value has many uses. For example, it may allow for the adaptation of maintenance intervals, determine allowed zone of operation for delivery drones or autonomous delivery vehicles. Change of state and its quantification in terms "performance values" can be used to better hone and time new release functional content, robo-taxi allowable zones of operation and fare structure to be inclusive of liability insurance risk management. If the change of state value indicates that a patch results in a more efficient and/or less wearing autonomous operation of the device, respectively, maintenance intervals may be stretched accordingly for instance. Alternatively or additionally, the production and/or storage of spare parts may be optimized based on the change of state value. In a similar vein driving quality performance could be used to determine the level of operator training, class of license certification, insurance risk class, operator/operating restrictions like time windows, weather, etc. allowed for the vehicle operation, for example, by elderly or physically compromised individuals.

In one particular example, performance parameter values of an autonomous vehicle obtained during autonomous driving are received. Here, autonomous driving preferably also includes assisted driving, i.e., any operation of the vehicle where supporting functions are controlled by software or the vehicles AI, respectively.

If the device is an autonomous vehicle, such performance parameter values are advantageously driving parameter values, for example speed, acceleration, current position of the vehicle, steering wheel angle, pedal usage, traffic patterns, situational awareness, response to dynamic and stationary objects on or adjacent to the thoroughfare, a value associated with a transfer of control from the vehicle AI to a human driver, and/or the same. Based on the driving parameter values and information associated with the change in the code of autonomous driving software and/or firmware of components of the vehicle, a driving quantity quantifying the quality of autonomous driving of the vehicle may be determined. Alternatively or additionally, the driving quantity may be determined based on information associated with a change in the hardware of the vehicle, e.g. if components of the vehicle related to autonomous driving like sensors, actuators or processors are exchanged or repaired, or if the maintenance state is changed, e.g. due to wheel alignment, brake shoe replacement, sensor replacement, cleaning. For examples, apertures for sensors, i.e., viewing ports, may be cleaned in a manner that it affects the driving.

Alternatively or additionally, the scheduling and/or content of successive code base updates may depend on the timely ability to assess autonomous performance resulting from previous updates and/or hardware upgrades. The ability to predicate updates based on most current autonomous control status, i.e., change of state value, may on-average make each respective update more effective while reducing overall code maintenance cost. Also the statistical characteristics being measured may infer that further code etc. updates should be delayed until the statistical assessment is deemed to be complete in terms of at least convergence to the statistical "population" value for said performance quantity.

Preferably, it is another object of the invention to improve operation of an autonomous device, in particular after a change of state of the autonomous device has been detected.

This object is solved by a method—in particular a computer implemented method—according to a second aspect of the invention. Said method may be suited for adapting an operation requirement of an autonomous device and preferably comprises at least one of the steps of (i) receiving a plurality of performance parameter values obtained by monitoring at least one performance parameter during autonomous operation of the device; (ii) determining a performance quantity quantifying the quality of autonomous operation of the device based on the received performance parameter values; (iii)) determining a change of state value for the device based on the performance quantity (iv) determining at least one requirement for operating the device based on the change of state value and/or the performance quantity and associating the operation requirement with the device.

The so-associated operation requirement may, for instance, relate to maintenance intervals, allowed zone of operation, timing new release functional content, and fare structure of e.g. robo-taxis to be inclusive of liability insurance risk management. For example, by associating the operating requirement, maintenance intervals can be adapted or scheduled, the allowed zone of operation can be determined, new release functional content can be timed, or the fare structure of e.g. robo-taxis can be adjusted. Alternatively or additionally, production and/or storage of spare parts may be optimized for the respective devices class. In a similar vein the level of operator training, class of license certification, insurance risk class, operator/operating restrictions like time windows, weather, etc. allowed for said vehicle operation e.g. by elderly of physically compromised individuals could be associated with the vehicles of the class.

An aspect of the invention is based on the approach of adapting the operation of an autonomous device, in particular the requirements for its operation, based on its observed autonomous behavior. For example, if a behavioral change has been observed, the software of the device or mission parameters may be adjusted. The behavioral change is advantageously indicated by a change of state value as derived from a performance quantity of the device. Based on the change of state value and/or this performance quantity, an operation requirement can be determined and associated with the device.

Preferred embodiments of the invention and further aspects thereof are described below, each of which, unless expressly excluded, may be combined with each other and with the aspects of the invention described below as desired.

In a preferred embodiment, the change of state value is determined by comparing the determined performance quantity with a previously determined performance quantity. In particular, the change of state value may correspond to the difference between the determined (current) performance quantity and the previously determined performance quantity. This not only allows for easy determination of whether a change in the software and/or hardware of the device has advantageous or detrimental effects, but also to quantify the extent of the effect.

Preferably, the change of state value scales with the performance quantity. For example, a large difference between the current performance quantity and a previously determined performance quantity may result in a high change of state value, whereas a low difference may result in a low change of state value. Preferably, a high change of state value indicates a severe or significant change in the behavior of the device during autonomous operation, while a low change of state value indicates a relatively more minor change in the device behavior.

In another preferred embodiment, the change of state value is compared to a threshold and, depending on a result of the comparison, the performance quantity and/or the change of state value is output. If the change of state of value and/or performance quantity reaches or exceeds the threshold, this could indicate that requirements and/or settings for autonomous operation of the device need to be adapted. For example, if the change of state value exceeds the threshold because the device operates more safely and/or more efficiently, it would be appropriate to delay the next maintenance or to change the supply chain priority. Alternatively or additionally, an insurance premium could be lowered. By outputting the state of change value and/or the performance quantity, the adaptation of such requirements and/or settings could be performed e.g. by according service providers. For example, depending on the result of the comparison, the performance quantity and/or the state of change value may be sent to a plurality of servers for further processing, for example for rescheduling maintenance, changing supply chain priority, or obtaining a new insurance bid.

As another option, instead of or in addition to the change of state value and/or performance quantity, an accident risk associated with the respective change of state value and/or performance quantity is compared to a threshold and, depending on a result of the comparison, output.

In yet another preferred embodiment, preferably depending on a result of the comparison, the performance quantity and/or the state of change value is sent to a plurality of servers and in return to sending the performance quantity and/or the change of state value, server data indicative of the operational requirement associated with operation of the autonomous device is received from each of the servers. Advantageously, such an operational requirement is a cost for operating the device and/or a maintenance requirement. For example, an operational requirement could be an insurance premium, or the replacement of a component or repair thereof, or proactive ordering of spare components for revised expected rate of replacing worn out parts, respectively. By means of sending the data to the plurality of servers, determination of the operational requirements may be performed externally, for example by a plurality of external, particularly specialized service providers. By receiving the data from the plurality of servers, assessment from different service providers may be gathered in order to optimize management of the device.

Again, it is an option to alternatively or additionally send the accident risk associated with the change of state value and/or performance quantity to the plurality of servers.

In yet another preferred embodiment, a test is performed which of the server data fulfill a predetermined criterion, and, based on the result of the test, server data is chosen and associated with the device and/or operation of the device, respectively. For example, only if the server data indicates operational requirements differing significantly from current usage of the device, this server data may be associated with operation of the device and form the basis of an accordingly adapted usage of the device. This allows for optimization of the device usage.

Advantageously, the criterion is determined based on the total of received server data. In other words, the server data from different servers is preferably compared to each other. Based on this comparison, server data from one of the plurality of servers may be chosen and associated with autonomous operation of the device. For example, in order to secure reliable operation of the device, server data indicative of an imminent maintenance requirement or repair, respectively, may be chosen. In another example, in order to save costs, server data indicative of a minimum insurance premium may be chosen.

In yet another preferred embodiment, the change of state value and/or performance quantity is re-sent to the plurality of servers based on a result of the comparison of the server data or the testing, respectively. By this means, re-evaluation can be performed if no operation requirement is acceptable. For example, insurance providers may place a re-bid if none of their previously offered premiums is acceptable.

In yet another preferred embodiment, the change of state value and/or performance quantity is output periodically. For instance, the value and/or data can be sent in predetermined time intervals. By this means, it can be achieved that the operation requirements associated with the device are always up to date.

In yet another preferred embodiment, the change of state value and/or performance quantity is output, e.g. sent to a plurality of servers, a predetermined amount of time after a flux in software and/or hardware associated with autonomous operation of the device occurred. By this means, it can be achieved that operation requirements for the device are reliably adjusted after sufficient sampling of performance parameter values has been performed.

In yet another preferred embodiment, the device is part of a group of autonomous devices, for instance a vehicle of a vehicle fleet of e.g. an autonomous vehicle service provider (AVSP). Preferably, a plurality of performance parameter values is received, these values being obtained by monitoring each of the devices of the group during autonomous operation. Advantageously, for each device of the group, an individual performance quantity is determined based on the obtained respective performance parameter values. Further preferably, also an individual change of state value is determined for each device. Advantageously, each device of the group is classified based on the respective performance quantity. Further preferably, a change of state value is determined for at least one class based on the individual performance quantities or the individual change of state values of the devices associated with this class. Preferably, at least one requirement for operating the devices of the at least one class is determined based on the individual performance quantities and/or performance parameter values and/or change of state values associated with the vehicles of the at least one class. The determined operation requirement may be associated with the devices of the at least one class.

By this "clustering" of devices into tranches, operation requirements for multiple devices can be efficiently determined and associated with the respective devices. An individual handling of all devices for example by an external service provider is no longer necessary. Instead, for example an AVSP may determine internally which ones of the vehicles of his vehicle fleet exhibit behavioral changes, for example, after a software update and/or hardware modification. The AVSP preferably notifies the external service provider accordingly, who then may determine or adjust the operation requirement for all vehicles of this tranche. The AVSP may then attribute this operation requirement with all vehicles of this tranche.

For example, data indicative of or related to the performance of devices of one class or "cluster" may be provided to a plurality of external service providers who e.g. specialize in determining operation requirements. For example, the change of state value and/or data indicative of the performance quantity of individual devices of a class could be sent to a plurality of external servers.

The classification allows for a statistical evaluation and a corresponding, particularly server-side, determination of the operation requirement(s). In particular, the classification may increase the efficiency of eventually attributing the, particularly server-side, determined operation requirement(s) to devices of the respective class.

In yet another preferred embodiment, determining the performance quantity comprises estimating the performance quantity based on a limited number of performance parameter values obtained since the occurrence of a change in software and/or hardware related to autonomous operation of the device. In particular, the performance quantity may be estimated without relying on an evaluation of the performance parameter values with Gaussian statistical methods and constraints. By taking into account only a limited number of performance parameter values since the change in software and/or hardware occurred, the performance quantity can be estimated in a particularly rapid manner, in particular consistent and accommodating where possible the unpredictable window between said updates where any such update can change performance to a degree that prior statistical sampling to determine one or more performance parameters is no longer statistically valid. This, in turn, allows for adaptation of the utilization and/or treatment of the device rapidly after the change in software and/or hardware.

For example, the performance quantity may be estimated based on performance parameter values obtained during a predefined time interval. The beginning of the predefined time interval is advantageously defined by the point in time associated with the change in software and/or hardware. Alternatively or additionally, the performance quantity may be estimated based on a predefined number of random sampling events where performance parameter values obtained since the change occurred.

For example, a performance quantity quantifying the driving of an autonomous vehicle (i.e., a driving quantity) may be determined based on performance parameter values (i.e., driving values) obtained during five days after the change occurred. This means that conventional Gaussian statistics cannot be used here, because for providing an accurate and reliable driving quantity (i.e., for convergence), they require driving values from sampling periods which, in the case of motor vehicles, would relate to in the order of 50 to 60 sampling sessions, and each of the sampling sessions would require significant accrual of mileage. Hence, conventional Gaussian statistics would realistically require a sampling period of at least between 50 and 60 days or periods of vehicular use wherein during which time multiple code and/or hardware updates will have altered device performance reducing the Gaussian inference value of prior collected performance factor data points.

In yet another preferred embodiment, for determining the performance quantity quantifying the quality of autonomous operation of the device, performance quality values are successively determined based on the plurality of received performance parameter values. Preferably, while the performance quantity quantifies the overall autonomous operation, the performance quality values reflect the quality of autonomous operation in, particularly predefined, sampling intervals, for example time intervals or distances. During intervals of autonomous operation of the device, the performance quality is expected to change, in particular to fluctuate. In other words, the performance quality is dynamic, reflected by variations in successively determined performance quality values. According to the central limit theorem, the fluctuations of the performance quality values determined for each of the sampling intervals tend to a normal distribution and converge to the mean value of its probability density function (pdf).

Such variations in the sampled performance quality values are caused, for instance, by the inevitable difference of subsequent situations the device is confronted with, or with changing environmental conditions (or, more generally speaking, with changing boundary conditions). Also, the variations can reflect the capability of the then current version of control software and/or hardware in the respective vehicle whose performance is being assessed and quantified by random sampling. Therefore, for autonomous vehicles, a driving performance quality value is also termed AVDP value (autonomous vehicle dynamic parameter).

For example, values of a driving parameter like speed, acceleration or turning of the steering wheel may be determined during autonomous driving of an autonomous vehicle. These values correspond to performance parameter values and are also termed driving values.

Each obtained performance parameter value/driving value may advantageously be compared to a geostationary value of the same parameter, e.g. a speed limit, a prevailing speed, or another parameter value of other vehicles at the same location, in the same state, in the same nation and/or at the same time of day or weather or traffic density. The comparison result may be termed a resulting value. Alternatively, a plurality of performance parameter values/driving values may be combined to a resulting value.

A plurality of such resulting values, particularly sampled during a sampling interval, may be consolidated to a performance quality value, which can be the mean, median or other mathematical subsumption of the resulting values. For example, the resulting values determined from autonomous driving during a driving period are consolidated to a driving quality value. Such driving period or sampling interval may correspond to a predefined driving distance, e.g. 100 kilometers, or a predefined driving time, e.g. 1 hour, or mileage accrued in successive 24 hour periods or other predetermined time intervals.

Preferably, determining the performance quantity is based on filtering a plurality of successively obtained performance quality values. In particular, the performance quantity may be determined iteratively based on the plurality of successively obtained performance quality values. For example, the performance quantity is determined as a convergence of values, which is successively calculated based on the performance quality values. In other words, determining the performance quantity advantageously comprises successively determining values for the performance quantity based on the performance quality values, preferably until a convergence criterion is satisfied.

Here, filtering advantageously means processing a set or stream of input data such that a complexity of this input data is reduced. Therein, complexity is reduced if dimensions of the input data are reduced, the input data converge to a population value, noise is reduced, correlations of the input data are obtained, and/or the like. In particular, filtering may correspond to generating an output value from the input data, wherein the output conveys at least the main characteristics of the input data. For example, filtering may correspond to smoothing the input data, or in another manner simplifying the input data. Preferably, filtering is achieved by means of a (mathematical) transfer function applicable to the input data.

Preferably, by filtering, the weight of the sampled performance parameter values, particularly the performance quality values, in the determination of the performance quantity is augmented. Advantageously, the filter applied to the performance parameter values, particularly the performance quality values, is a function of the information associated with the flux of software and/or hardware.

For example, based on this information, it is possible to modify the manner of data input to the filter. Based on the information, a sampling interval from which data is processed by the filter can be determined, for instance. Alternatively or additionally, the filter function itself could be modified. For example, if the filter is embodied by a weighted average, the weights applied to respective terms in the average could be modified based on the information.

The filtering is advantageously achieved by Kalman filtering. Alternatively, there are other modes of filtering known in the literature. For example, in addition or in an alternative to Kalman filtering, the filtering can be achieved by as simple means as computing a running average. Therein, filtering is preferably characterized by the extent of the prior sampled data used in the current calculation of said performance quantity. The extent of the prior sampled data, i.e., the length of a sampling interval or "restricted window" from which performance parameter values are sampled and—directly or after some processing—serve as input to the filter, may be variable and dependent on a characteristic adjudged statistically. Such a characteristic may be the mean error or uncertainty of the plurality of performance quality values being sampled, for instance. By means of filtering's convergence analytic properties, an accurate estimate for the performance quantity can be obtained in a particularly fast manner.

In yet another preferred embodiment, determining the performance quantity comprises Kalman filtering of successive performance quality values each derived from a plurality of performance parameter values. By means of Kalman filtering, a particularly fast convergence towards an accurate estimate of the driving quantity, e.g. an estimate with a low associated uncertainty, can be achieved.

In yet another preferred embodiment, a Kalman Gain for recursively calculating an estimate of the performance quantity is determined based on the information associated with a flux of software and/or hardware related to autonomous operation of the device. In particular, the Kalman Gain may be adapted or modified depending on the change of software and/or hardware. For example, the Kalman Gain may be modified by a parameter complementary to the normative Kalman Gain factor, i.e., a separate variable. The normative Kalman Gain can read, for instance, $$G = \frac{(\sigma_{t-1})}{(\sigma_{t-1} + \sigma_t)},$$

where $\sigma$ is a variance and t is an enumerator for iterations of the Kalman filter algorithm. The complementary parameter may be a function of an uncertainty associated with the input of the Kalman filter or the output of the Kalman filter, for instance associated with the performance quality values or a previously determined performance quantity.

Advantageously, the Kalman Gain is thereby further adapted based on a deterministic value indicative of the severity of the software/hardware change that has been loaded and registered on said vehicle being assessed directly after said update took place. For example, if the change relates to a low-level, e.g. merely cosmetic, change of software code, the Kalman Gain may be left substantially unaltered from its normative gain value. If, however, the change relates to a high level change of software code, which is expected to substantially influence the function of the code—and thereby the autonomous operation of the device—, the gain may be more strongly adapted by virtue of e.g. an additive or multiplicative factor. By this means, the Kalman filter can be optimized in terms of convergence speed if indeed the update has capacity to make a significant impact on the autonomous performance.

The Kalman Gain modified based on the information associated with a flux of software and/or hardware is preferably referred to as an optimized Kalman Gain (oG), particularly in contrast to the normative Kalman Gain as represented by the formula above.

In yet another preferred embodiment, based on the information associated with a flux of software and/or hardware related to autonomous operation of the device, the, preferably normative, Kalman Gain—as represented by the above formula, for instance—is modified by a predetermined amount. For example, the normative Kalman Gain may be multiplied with a predetermined weight factor. Alternatively, a predetermined value may be added to the normative Kalman Gain. By modifying the Kalman Gain, corresponding emphasis can be put on the most current sampled and input data. This is particularly advantageous if the change of software and/or hardware is likely to have a strong influence on autonomous operation of the device. Hence, the optimized Kalman Gain can accelerate convergence to the code/hardware updated and hence likely altered performance quantity. Essentially, the optimized Kalman Gain can prevent deferring too much to prior data when it has been deterministically advised—by means of the information relating to the flux of software and/or hardware—that the previously determined performance quantity quantifying the quality of autonomous operation prior to the change in software and/or hardware has been altered to some degree. Thereby changes in the behavior of the autonomous device can be isolated, identified, and quantified in an accelerated manner.

Increasing the normative Kalman Gain by a predetermined amount based on the information on software and/or hardware flux may effectively correspond to modifying a data input parameter or factor, respectively. It is, however, also conceivable to alternatively or additionally modify constants, variables and/or boundary conditions related to the formula or algorithm, respectively, used to calculate the (normative) Kalman Gain or other formulations that use the sampled data to affect a relevant measurement. In particular, the whole Kalman Gain formula—as given above, for instance—or algorithm, respectively, could be modified, e.g. switched, based on the information.

In yet another preferred embodiment, the information associated with a flux of software and/or hardware related to autonomous operation of the device comprises an information on the type of code module or hardware module in which the code change is present or which is changed, respectively. Advantageously, the predetermined weight factor for multiplication with the normative Kalman Gain or the predetermined value to be added to the normative Kalman Gain scales with the type of code or hardware module and/or criticality of the code/hardware changes made therein. In other words, the predetermined weight factor or value may be a function of the type of code or hardware module. For example, if the change is in a high-level, centrally used, code module or geo-data related module such as vehicle or server based map content or interpretation modules etc. which in turn can more likely and significantly impact the behavior of the device, the predetermined weight factor or value may be large. Alternatively, if the change is in a low-level code module, e.g. only relates to cosmetic changes, the predetermined weight factor or value may be low. This enables efficient evaluation of the performance quality values.

Alternatively or additionally, the weight factor for multiplication with the normative Kalman Gain or value to be added to the normative Kalman Gain is dynamic. In particular, depending on an uncertainty associated with the respective estimation of the performance quantity or the state of convergence, respectively, the weight factor or value applied to the normative Kalman Gain may be adapted. Alternatively, the weight factor or value applied to the normative Kalman Gain may be adapted based on the information associated with the flux of software and/or hardware. It is particularly conceivable that the weight factor or value is situationally adapted, i.e., based on the circumstances of the change in software and/or hardware.

A low uncertainty of the current input—relative to the uncertainty of the previous estimation—motivates a higher Kalman Gain that weights the current output in favor of current input when entered into the normative formulation for Kalman Gain. High uncertainty in the currently input data gravitates the Kalman Filter to weight the current output in favor of the previous estimates, effectively causing the updated Kalman filter output to remain functionally wedded to the prior input.

Accordingly, depending on how strongly the filter has converged, the weight factor for multiplication with the normative Kalman Gain or value to be added to the normative Kalman Gain may be increased or decreased in order to control the bias of the filter output towards current input data. For example, if the convergence is already high, the weight factor or the value to be added may be reduced.

In yet another preferred embodiment, the Kalman Gain is increased by a first amount for code changes. It appears from testing with test data covering performance change events initiated by over the air updates and/or other releases that for a balanced increase, a value for example between 0.2 or 0.3, in particular 0.25, may be added to the normative Kalman Gain when the information relates to a code change in the control software. The value to be added may be termed CSC (code status change) value. Alternatively—but having essentially the same effect—, the normative Kalman Gain may be multiplied with a weighting factor between 1.2 and 1.3 (or 1.25) for updates of the control software controlling the autonomous operation of the device.

Herein, a balanced increase preferably means that albeit in the determination of the performance quantity, weight is put on recently sampled data over previous estimates of the performance quantity, this recently sampled data are not over emphasized.

Alternatively or additionally, the Kalman Gain may be increased by a second amount for hardware or firmware changes. The second amount is advantageously different from the first amount. It appears from testing with test data covering performance change events initiated by hardware upgrades or repair that for a balanced increase, a CSC value between 0.25 or 0.35, in particular 0.3, may be added to the normative Kalman Gain when the information relates to a hardware or firmware change. Alternatively—but having essentially the same effect—the normative Kalman Gain may be multiplied with a weight factor between 1.25 and 1.35 when a sensor of the device has been replaced or corresponding firmware has been updated.

By this means, different changes to the software and/or hardware of the device can be weighted differently. In particular, it can be reflected that code changes often only or at least partially relate to portions of the code that do not directly govern the behavior of the device. Such portions can, for example, relate to a graphical user interface. In contrast, changes to firmware or hardware almost always have an impact on the behavior of the device because they affect e.g. data acquisition.

The optimum value to be added to the normative Kalman Gain or the weight factor, respectively, for varied severity of software and/or hardware updates may be determined by (test) data covering performance change events initiated by software and/or hardware flux accrued by the AVSP. For example, these (test) data can be reduced to least squares regression equations to further generalize and systematize CSC valuation for all mixes of update severity. In particular, such testing or processing of the (test) data to determine the optimum Kalman Gain increase could be performed during or as part of Beta testing, respectively.

For a combined software and hardware update, the higher of the respective amounts may be used. For example, if the weight factor associated with a specific software update is 1.3 and the weight factor associated with a specific hardware modification is 1.25, and both the software update and hardware modification are rolled out at the same time, the normative Kalman Gain may be multiplied by 1.3 in order to emphasize input to the Kalman filter representative of performance parameter values obtained after the roll out. Of course, this adjustment in Kalman Gain bias of prediction can alternatively be affected by direct addition of the appropriate CSC value to the then current normative Kalman Gain value.

Usually, the Kalman Gain takes values lower than 1. However, principally values equal or greater than 1 are conceivable as well. In fact, empirical observations may and can justify a range for the modified Kalman Gain which extends beyond 1. Such large values are particularly reasonable when a change in software and/or hardware—such as a major new release, overhaul or new vehicle for which can be reasonable expected to have a substantial effect on the behavior of the autonomous device.

In yet another preferred embodiment, the increased Kalman Gain is successively scaled up or down in at least two successive determinations of the Kalman Gain, e.g. in a plurality of successive Kalman Filter updates as the filter output converges to the performance quantity. Advantageously, the increased Kalman Gain is scaled up or down in a predefined manner. Preferably, the weight factor or CSC value to be applied to the normative Kalman Gain is gradually scaled up or down in a plurality of successive determinations of the Kalman Gain. Scaling down the normative Kalman Gain may prevent putting too much emphasis on input to the Kalman filter once the Kalman filter output quantity starts to reflect and converge to the update caused change in behavior due to the software and/or hardware updates. Similarly, scaling up the normative Kalman Gain may accelerate convergence if the flux in software and/or hardware is significant.

For example, if a code change is severe and the modification of the Kalman Gain should be large accordingly, a predetermined weight factor may be multiplied with the normative Kalman Gain initially, or a predetermined CSC value may be added to the Kalman Gain initially. Accordingly, the current input to the Kalman filter will be accordingly weighted in the next Kalman filter output estimate for the performance quantity. In the subsequent determination of the Kalman Gain, however, only a fraction of the initial predetermined weight factor or initial predetermined CSC value previously applied to the normative Kalman Gain may be considered. Accordingly, the previous prediction of the performance quantity has an adjusted influence on the next (current) estimate of the performance quantity.

Preferably, the weight factor is scaled down until it equals one. If a CSC value is added to the normative Kalman Gain, this value is preferably scaled down until it is nulled.

Alternatively or additionally, modification of the (normative) Kalman Gain can be terminated if a set condition is met. For example, the modification can be terminated if a predetermined number of filter updates, i.e., iterations, has been performed. This may help prevent to overemphasize software and/or hardware updates and/or stabilize the convergence of the filter.

Preferably, a scaling factor for decreasing the CSC value or the weight factor, respectively is predetermined. Such scaling factor may be predetermined, for instance, by evaluating (test) data covering performance change events initiated by software and/or hardware updates. In particular, the scaling down may be tested based on different scaling factors. Preferably, these (test) data can be reduced to least squares regression equations to further generalize and systematize scaling factor valuation. By this means, an optimum scaling factor can be (pre)determined.

In yet another preferred embodiment, the scaling up or down of the increased Kalman Gain depends on the number of code modules and/or hardware modules in which the code change is present or which is changed, respectively. For example, the weight factor or CSC value applied to the normative Kalman Gain may be scaled down in successive determinations of the increased Kalman Gain by multiples of an inverse of the number of code change modules and/or hardware modules.

Because a change in multiple modules increases the probability that effects on the autonomous operation of the device accumulate, taking the number of changed modules into account can increase the rate of convergence of the Kalman filter towards a reliable, statistical convergent estimate of the performance quantity.

For example, if changes in 10 code modules and/or hardware modules are introduced, the associated weight factor to be multiplied with the normative Kalman Gain or CSC value to be added to the normative Kalman Gain may be reduced by $\frac{1}{10}$ in each successive estimate of the performance quantity. Accordingly, for the first estimate after the change occurred, the full weight factor or CSC value is applied. For the second estimate, i.e., the first iteration of the Kalman filtering, $\frac{9}{10}$ of the weight factor or CSC value is applied. For the third estimate, $\frac{8}{10}$ of the weight factor or CSC value is applied, and so on. After $\frac{1}{10}$ of the weight factor or CSC value has been applied for the tenth estimate after the change occurred, no weight factor or CSC value is applied any longer. Preferably, the successive Kalman Gain is conventionally computed, i.e., corresponds to the normative Kalman Gain variance based formula.

In yet another preferred embodiment, scaling up or down the increased Kalman Gain depends on the p-value of a null-hypothesis test comparing successive estimates for the performance quantity. Therein, the null-hypothesis preferably relates to the convergence of the estimated performance quantity. In other words, by means of the null-hypothesis, it can be tested whether the two successive estimates for the performance quantity are similar due to convergence of the filtering, or only due to statistical coincidence, for instance.

For example, a low p-value for two successive estimates of the performance quantity indicates a low probability that the null-hypothesis is valid, i.e., an "accept". Accordingly, if the p-value does not reach or exceed a predefined p-value threshold, the increased Kalman Gain may be scaled down only slightly, e.g. only between 5% and 15% of its difference to the normative Kalman Gain, or not at all. In fact, in such a case it may be advantageous to scale up the increased Kalman Gain. For example, the predetermined weight factor or CSC value may be reduced or increased by between 5% and 15%.

If, however, the p-value for two successive estimates of the performance quantity is large, e.g. reaches or exceeds the predefined p-value threshold, it indicates a high probability that the null-hypothesis is valid. Accordingly, the increased Kalman Gain may be scaled down substantially, e.g. by the corresponding p-value or by a significant value between 30% and 80 of its difference to the normative Kalman Gain. For example, the predetermined weight factor may be reduced by between 30% and 80%. Taking into account the p-value allows for assessing the state of convergence of the estimated performance quantity. By this means, the increased Kalman Gain may be scaled down automatically when convergence becomes apparent. Similarly, the increased Kalman Gain may be scaled up if no indications of convergence can be found.

In yet another preferred embodiment, the Kalman Gain is modified based on a result of a null-hypothesis test comparing successive estimations for the performance quantity and/or the associated uncertainties. For example, the variance of an estimate for the performance quantity may be compared with the variance of a successive estimate and similarly their respective mean values representative of the performance quantity. The null-hypothesis is an "accept" if these two variances and/or two mean values match in a statistical sense. Preferably, upon an "accept" of the null-hypothesis, the weight factor to be multiplied with the normative Kalman Gain or CSC value to be added to the normative Kalman Gain is no longer applied as an increment to the normative Kalman Gain. In the negative, the weight factor or CSC value is applied further, preferably until the null-hypothesis test is accepted. It is particularly preferred if the weight factor or CSC value is applied until two successive series of null-hypothesis tests are accepts. Testing the uncertainty of successive estimations for the performance quantity against each other provides a reliable termination criterion which may be associated with the onset of convergence of the estimated performance quantity.

Alternatively, the optimized Kalman Gain is applied for a predetermined number of successive estimates of the performance quantity. This may be advantageous for reducing complexity and saving computational power.

In yet another preferred embodiment, an accident risk is associated with the determined performance quantity. The accident risk may be a mileage per accident or the probability of an accident for predetermined mileage. By associating the performance quantity with an accident risk, the determined change of state value allows for assessing the influence of the code and/or hardware change on the accident risk. This may simplify quality management. In particular, during the development process of the autonomous device, particularly its control software, the effect of code changes can be easily quantified.

With the above and other objects of the invention, there is also provided, in accordance with a third aspect of the invention, a system for determining a change of state of an autonomous device, in particular an autonomous vehicle, comprising: (i) a receiving module configured for receiving a plurality of performance parameter values obtained by monitoring at least one performance parameter during autonomous operation of the device; (ii) a quantity determining module configured for determining a performance quantity quantifying the quality of autonomous operation of the device based on the obtained performance parameter values and information associated with a flux of software and/or hardware related to autonomous operation of the device; and (iii) a change determining module configured for determining a change of state value for the device based on the performance quantity.

With the above and other objects of the invention, there is also provided, in accordance with a fourth aspect of the invention, a system for adapting operation requirements of an autonomous device. The system preferably comprises at least one of (i) a receiving module configured for receiving a plurality of performance parameter values obtained by monitoring at least one performance parameter during autonomous operation of a device; (ii) a quantity determining module configured for determining a performance quantity quantifying the quality of autonomous operation of the device based on the obtained performance parameter values; (iii) a change determining module configured for determining a change of state value for the device based on the performance quantity; (iv) an association module configured for determining at least one requirement for operating the device based on the change of state value and/or the performance quantity and associating said operating requirement with the device.

Preferably, the association module is configured to receive the at least one operation requirement, for example in form of server data provided by a plurality of external servers. To this end, in particular to trigger receiving the operation requirement, the association module may be configured to output the change of state value and/or the performance quantity. Advantageously, the association module is configured to send the change of state value and/or performance quantity to the plurality of external servers.

The properties, features and advantages of the invention described above, as well as the manner in which they are achieved, will be explained in more detail in connection with the figures in the following description of examples. Where appropriate, the same reference signs are used in the figures for the same or corresponding elements of the invention. The examples serve to explain the invention and do not limit the invention to the combinations of features indicated therein, even with respect to functional features. Moreover, any of the features disclosed in the above description as well as in the examples below may be considered in isolation and suitably combined with the features of any of the above embodiments and their further aspects. In particular, each of the features described above and below may be combined alone or in conjunction with others of the described features with the method according to the first aspect of the invention, the method according to the second aspect of the invention, the system according to the third aspect of the invention and the system according to the fourth aspect of the invention.

Other features which are considered as characteristic for the invention are set forth in the appended claims.

Although the invention is illustrated and described herein as embodied in method and system for determining a state change, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
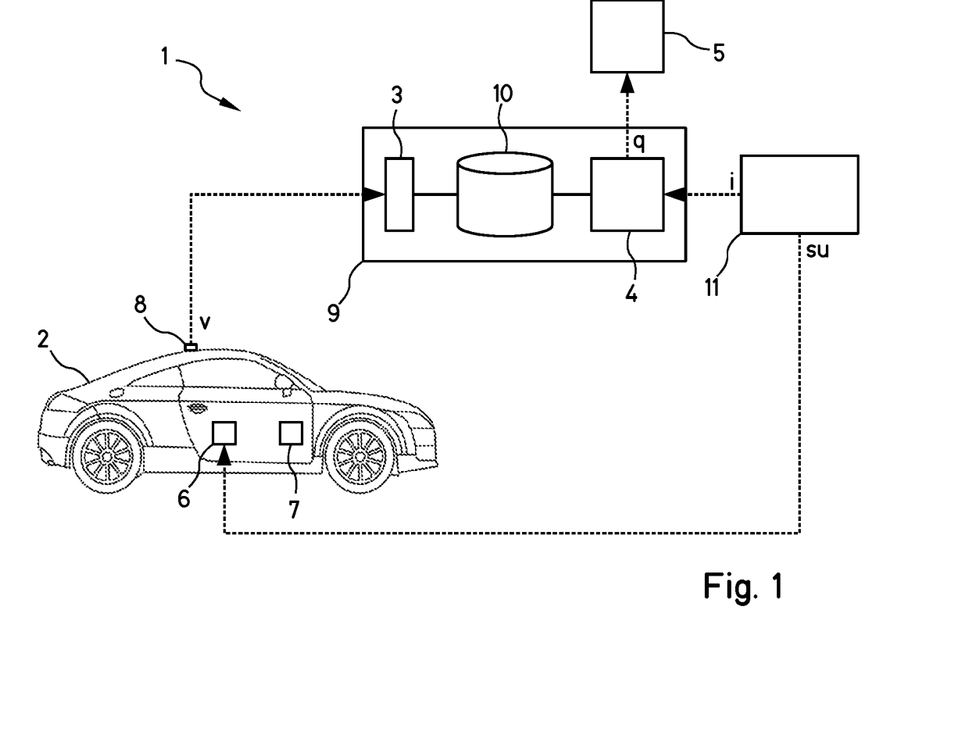
FIG. 1 is a diagram showing an example of a system for determining a change of state of an autonomous device.

Referring now to the figures of the drawing in detail and first, in particular, to FIG. 1 thereof, there is shown an example of a system 1 for determining a change of state of an autonomous device 2. The system 1 comprises a receiving module 3 for receiving a plurality of performance parameter values v, a quantity determining module 4 for determining a performance quantity q quantifying the quality of autonomous operation of the device 2, and a change determining module 5 for determining a change of state value for the device 2. It is preferred when the receiving module 3 and the quantity determining module 4 are part of a server 9. In some embodiments (not shown), the change determining module 5 may be part of the server 9 as well.

In the present example, the autonomous device 2 is an autonomous vehicle. The device 2 preferably comprises a control module 6 configured to autonomously control at least a part of the functions of the device 2, e.g. acceleration/deceleration, steering/swerving, monitoring the environment, and/or the like of the vehicle. By means of the control module 6, the vehicle may operate autonomously. Alternatively or additionally, the control module 6 may assist a human driver of the vehicle in operating the vehicle. The control module 6 preferably comprises a control software which, when executed, controls at least a part of the functions of the vehicle. The software may represent an artificial intelligence (AI) controlling the device 2, or constitute at least a part thereof.

The device 2 preferably comprises a monitoring module 7, for example a sensor assembly and/or an electronic control unit (ECU), configured to monitor at least one performance parameter during autonomous or semi-autonomous operation of the device 2, e.g. autonomous driving or at least assisted driving of the vehicle. Such a performance parameter is advantageously a parameter which characterises at least a part of the operation of the device 2. Preferably, a performance parameter is associated with a physical variable, i.e., it can preferably be expressed e.g. in metric units. A performance parameter may be, for example, a vehicle speed, a vehicle acceleration/deceleration, and/or the like.

The device 2 preferably further comprises an interface 8. The interface 8 may be configured to provide performance parameter values v obtained by monitoring or "measuring", particularly capturing, the at least one performance parameter to the receiving module 3. The interface 8 may, for example, comprise a transmitter for sending the performance parameter values v to the receiving module 3 over the air. In other words, the interface 8 is preferably configured to transmit the obtained performance parameter values v wirelessly to the receiving module 3. To this end, the interface 8 may be configured to establish a wireless Internet connection. The receiving module 3 may accordingly comprise a receiving interface of a server 9, over which receiving interface the server 9 is coupled to the Internet.

Alternatively, the interface 8 may not be part of the device 2, but rather a separate component connectable to the device 2. For example, the interface 8 may be a mobile device, such as a smartphone, which is coupled to the vehicle, in particular to the monitoring module 7.

The performance parameter values v received by the receiving module 3 may be stored in a data storage module 10, for example a memory of the server 9. The quantity determining module 4 may be configured to access the data storage module 10 and retrieve performance parameter values v. By this means, the performance quantity q can be determined retrospectively. Alternatively, the received performance parameter values v may be fed directly to the quantity determining module 4 (not shown) for immediate processing, in particular real-time or at least close to real-time processing.

The quantity determining module 4 is configured to determine the performance quantity q based on the obtained performance parameter values v and information i associated with a flux of software and/or hardware related to autonomous operation of the device 2. For example, the quantity determining module 4 may be configured to determine the performance quantity q based on the performance parameter values v and information i on changes of the control module 6, in particular the control software, controlling autonomous operation of the device 2. In particular, the quantity determining module 4 may be configured to consider code changes in the software and/or hardware when determining the performance quantity q. In other words, the information i is preferably indicative of a change in software and/or hardware controlling autonomous functions of the device 2.

Such information i is preferably provided to the server 9, in particular to the quantity determining module 4, by a provider of the autonomous device 2. For example, the information i may be provided by an autonomous vehicle service provider (AVSP).

To this end, the system 1 may comprise a service provider server 11 which is configured to provide the information i, e.g. when rolling out a software update su for the device 2. Herein, a software update su shall include firmware updates as well. Alternatively or additionally, the service provider server 11 may provide the information i when a component part relevant for autonomous operation of the device 2 has been changed, for example upon repair or exchange/upgrade of the device 2. In other words, the information i may be provided at the quantity determining module 4 when the device 2 and/or its software has been physically modified or updated, respectively. Component parts which are relevant to the autonomous operation are, for example, sensors of the device 2, actuators for performing functions of the device 2, processing units for executing the control software and/or the same.

According to an embodiment that is not illustrated, the server 9 is a server of the AVSP. In that case, there is no separate service provider server 11. Rather, the server 9 preferably comprises an information module which generates and/or outputs the information i to the quantity determining module 4. The information module may particularly correspond to a software rollout module which updates and/or patches the control module 6 of the vehicle and correspondingly informs the quantity determining module 4.

In the present example, the change determining module 5 is not part of the server 9. Rather, the change determining module 5 may be part of another server. The change determining module 5 is configured for determining the change of state value for the device 2 based on the performance quantity q determined by the quantity determining module 4. For example, based on the performance quantity q or a sequence of subsequently determined performance quantities q, the change determining module 5 may be configured to quantify the impact of particular changes in software and/or hardware of the device 2 on the autonomous operation thereof, i.e., its autonomous behavior.

It is also conceivable that the change of state value is utilized for a computation of insurance premium rates, in particular a re-computation of these rates. For example, the change of state value may be associated with a risk factor, based on which insurance premiums could be assigned the device. The change of state value may particularly form a basis for UBI (usage based insurance).

Figure 2:
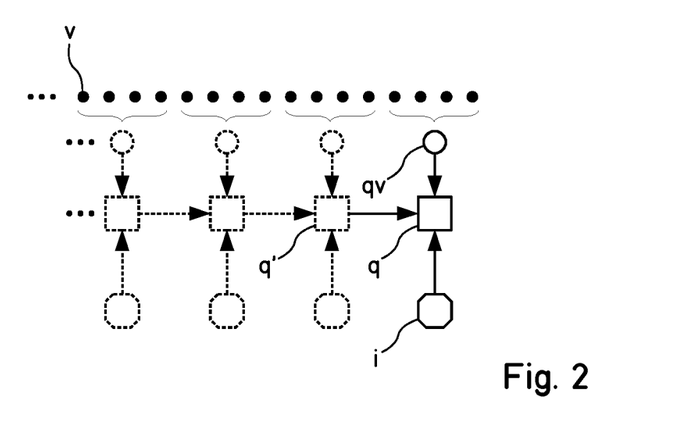
FIG. 2 is a schematic diagram of an example of determining a performance quantity based on a plurality of performance parameter values and on an information associated with the flux of software and/or hardware.

FIG. 2 shows an example of determining a performance quantity q based on a plurality of performance parameter values v and an information i associated with a flux of software and/or hardware related to autonomous operation. For reasons of clarity, same elements are indicated by a reference numeral only once.

The performance parameter values v are obtained by, preferably continuously, monitoring at least one performance parameter of an autonomous device during autonomous operation, for example of an autonomous vehicle during autonomous driving. Advantageously, the performance parameters characterize the manner of operation of the device, in particular the vehicle. Such performance parameters may be speed, acceleration, deceleration, steering wheel angle, pedal depression, and/or the like.

In order to obtain a reading on the quality of operation of the device, i.e., on how well the device performs during autonomous operation, a plurality of the performance parameter values v are preferably combined into a performance quality value qv in a predefined manner. This combination of performance parameter values v may be based, for example, on averaging, forming the median, and/or comparing the values v to a predetermined value. In other words, the combination of performance parameter values v is advantageously based on a mathematical subsumption. For example, for each performance parameter value v of a set of values v, the difference to a predetermined value may be determined, and the differences may then be averaged. Such predetermined value may be, for example, a statutory speed limit, an averaged acceleration of a plurality of vehicles in the same traffic situation, and/or the like.

Advantageously, by combining the performance parameter values v in a predefined manner, a metric is generated which allows to assess the quality of autonomous operation of the device. In particular, this metric may allow a quantitative comparison of the autonomous behavior of the device with the behavior of other autonomous devices. For example, the metric may allow comparing the autonomous driving of a vehicle relative to the driving of other autonomous vehicles and/or of human drivers. In other words, the metric may allow assessment of the performance of the autonomous device relative to the performance of other autonomously, semi-autonomously, and/or manually operated devices.

Preferably, the performance quality values qv are determined from performance parameter values v obtained during predetermined intervals, for example time intervals or a travel distances. These intervals may also be termed sampling or metric intervals.

The performance quantity q is advantageously determined based on a plurality of performance quality values qv, for example on performance parameter values v from at least two sets of performance parameter values v obtained during successive sampling intervals. In particular, the performance quantity q may be determined based on a previously determined performance quantity q' and a current performance quality value qv. Additionally, when determining the performance quantity q, the information i associated with a flux in software and/or hardware of the device is taken into account, as will be explained in more detail below in conjunction with FIG. 3.

As illustrated in FIG. 2, the performance quantity q is preferably determined by means of an iterative process. In other words, the performance quantity q is preferably estimated, wherein the estimate is based on the previously estimated performance quantity q' and the current performance quality value qv. The iterative process may be performed by a filtering process. Iteratively determining the performance quantity q has the advantage of being able to differently weight the input to the filter, for example depending on the information i.

Figure 3:
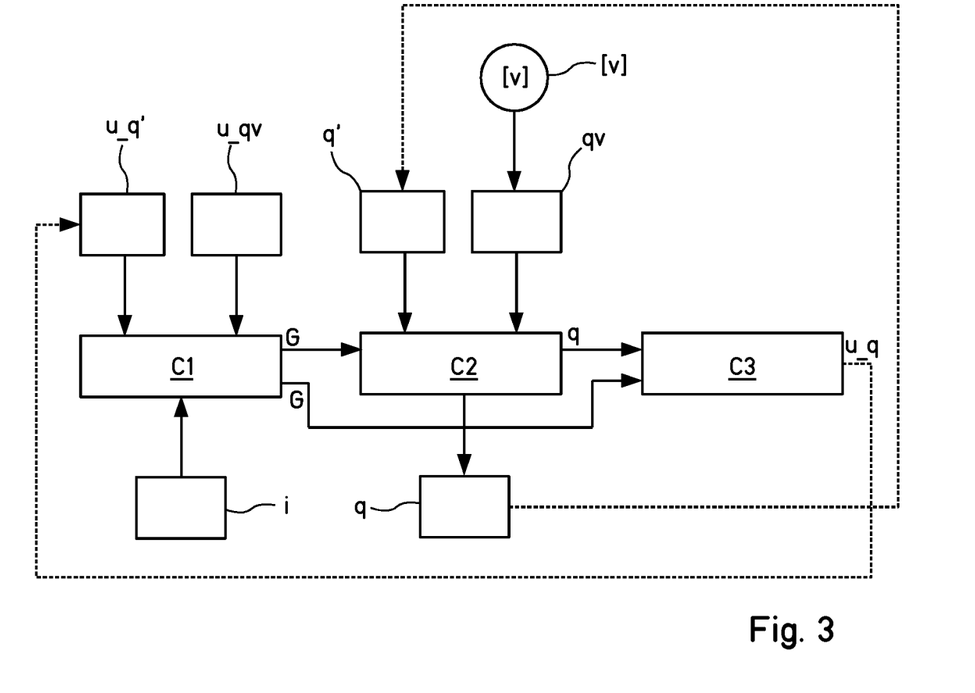
FIG. 3 is a block diagram of an example of estimating a performance quantity by means of Kalman filtering.

FIG. 3 shows an example of estimating a performance quantity q by means of Kalman filtering. Input to the Kalman filter is advantageously a previous estimate of the performance quantity q' and a plurality of performance parameter values v obtained during operation of an autonomous device, in particular a performance quality value qv based on the plurality of performance parameter values v (cf. FIG. 2). Therein, the performance quality value qv may be understood as a current measurement, in particular a quality of operation of the device measured during a metric (or sampling) interval (cf. FIG. 2).

The current estimate of the performance quantity q is preferably computed in computation step C2. The iterative character of the Kalman filter is illustrated by the dashed line connecting the current estimate q with the previous estimate q'. This line indicates that the current estimate q becomes the previous estimate q' in the next iteration.

Advantageously, the input to the Kalman filter is weighted during computation in step C2. The weighting is usually governed by the (normative) Kalman Gain G. For example, a high Kalman Gain G increases the influence of the current input of the Kalman filter, the so-called "measurement" (here corresponding to the performance quality values qv), relative to the previous estimate q' on the current estimate q. Conversely, a low Kalman Gain G increases the influence of the previous estimate q' on the current estimate q.

For example, the current estimate for the performance quantity q may be determined by $$q=(1-G)\cdot q'+G\cdot qv.$$

The Kalman Gain G is preferably not constant, but it is recomputed for each iteration of the filter, that is, for each new estimate of the performance quantity q.

The computation of the Kalman Gain G may be performed in computation step C1.

Basis for the computation of the Kalman Gain G is the uncertainty u_q' of the previous estimate of the performance quantity q' on the one hand, and the uncertainty u_qv of the (current) performance quality value qv. For example, the Kalman Gain G may be determined based on the variance associated with the previous estimate of the performance quantity q', and the variance associated with the input to the Kalman filter, i.e., with the performance quality value qv. The Kalman Gain G based solely on these uncertainties u_qv, u_q' is called the normative or "unmodified" Kalman Gain:

$$G = \frac{u\_q'}{(u\_q' + u\_qv)}.$$

The uncertainty u_qv of the performance quality value qv is preferably determined when combining a plurality of performance parameter values v into the performance quality value qv, e.g. when mathematically subsuming a set of performance parameter values v. For example, the uncertainty u_qv may be the variance obtained when forming the average, median, and/or any other statistical quantity from performance parameter values v obtained during a sampling interval (cf. FIG. 2).

The uncertainty u_q', on the other hand, is preferably determined as part of the iterative process of the Kalman filter. In particular, in a computation step C3, an uncertainty u_q of the current estimate of the performance quantity q may be determined. In this regard, the iterative character of the Kalman filter is illustrated again by a dashed line connecting the uncertainty u_q of the currently estimated performance quantity q with the uncertainty u_q' of the previous estimate of the performance quantity q'. This line indicates that the uncertainty u_q of the current estimate q becomes the uncertainty u_q' of the previous estimate q' in the next iteration.

In particular, in computation step C3, the uncertainty u_q' of the previous estimate q' (also conferred to as the filter prediction's uncertainty) may be the variance of the sampled input, i.e., the performance quality values qv, around the current estimate for the performance quantity q. In other words, the uncertainty u_q' may be based on the sum of the squared differences between at least a part of all previously processed performance quality values qv and the current estimate q.

Alternatively, the uncertainty q can be the variance of the sampled input around the mean of at least a part of all previous estimations q'. The mean can be computed e.g. by forming the normative average, or by forming a moving, running, exponential, smoothed, or weighted average.

Optionally, the uncertainty u_q could also be determined in computation step C3 by using the absolute values of respective differences—instead of squared differences—between sampled values (performance quality values qv) and the current estimate q or the subsumption of at least a part of all previous estimations q'. Alternatively or additionally, the uncertainty u_q can be determined based on the median, the mode, or the range of the distribution of previous estimations q'.

Preferably, the computation of the Kalman Gain G in computation step C1 is based on an information i associated with a flux in software and/or hardware related to autonomous operation of the device. In particular, based on the information i, the normative Kalman Gain may be modified. Hence, the Kalman Gain G determined in computation step C1 may correspond to an "optimized" Kalman Gain (oG).

The influence of the information i on the Kalman Gain G may translate into a modification of the estimate q. In particular, the influence of the information i on the Kalman Gain G may alter the relative weighting of the previous estimate q' and the performance quality value qv. In other words, the influence of the information i on the Kalman Gain G may emphasize either the previous estimate q' (i.e., the "prediction" of the previous performance quantity q') or the performance quality value qv, i.e., the current measurement.

The rationale behind taking into account information i on a flux of software and/or hardware associated with an autonomous operation of the device in computation step C3 is that such flux is likely to affect the autonomous operation of the device. Consequently, it can be expected that the performance quantity q changes, i.e., that a software and/or hardware update improves (or, less likely, deteriorates) the operation of the device. Including the information i when generating new estimates q can accelerate the convergence of the estimate q towards a stable value.

Preferably, as long as no change in the software and/or hardware occurs, the Kalman Gain G remains unmodified, i.e., the normative Kalman Gain is computed in computation step C1 and applied in computation step C2. If a change occurs, however, the Kalman Gain G may be modified in a predefined manner.

For example, based on the information i, the Kalman Gain G may be increased. In particular, based on the information i, a predetermined value may be added to the Kalman Gain G, or the Kalman Gain G may be multiplied with a predetermined weight factor.

For example, depending on the information i, the Kalman Gain G may be determined by $$G = \frac{u\_q'}{(u\_q' + u\_qv)} + CSC.$$

Therein, CSC may be a value associated with a flux of software and/or hardware associated with the autonomous operation of the device. Preferably, the suchlike optimized Kalman Gain G fulfills $$G = \frac{u\_q'}{(u\_q' + u\_qv)} + CSC < 1.$$

Preferably, the Kalman gain G is determined based on the severity of the change. Accordingly, the Kalman Gain G may be increased according to the information i indicative of this severeness. For example, if a code change in a low-level code module is introduced, or if the code change is merely cosmetic, a low CSC value—or even no CSC value at all—may be applied. For example, a CSC value between 0 and 0.1, particularly 0.05, may be added to the normative Kalman Gain. If the code change is introduced in a high level code module, or the code change relates to fundamental functions of the software, however, a high CSC value may be applied. For example, a CSC value between 0.2 and 0.3, particularly 0.25, may be added to the normative Kalman Gain. In the case of hardware upgrades or replacement, the increase of the Kalman Gain G might be higher yet. For example, the CSC value may take values such as 0.35. If software and hardware changes are pre-advised, the higher CSC value is assigned.

Alternatively or additionally, the information i can contain information on the number of software modules and/or hardware modules which have been changed. Depending on the number, the applicable CSC value may be chosen, or a predetermined CSC value may be increased or lowered. The rationale behind this is that, for example, if multiple modules are concerned, an impact of the change on the autonomous behavior is much more likely. Therefore, in this case, the CSC value may be increased/scaled up by an amount depending on the number of changed modules. On the other hand, if only one module is concerned, the CSC value may be left unaltered or even be decreased/scaled down by a predefined amount, or no CSC value may be applied at all.

In order to secure stable convergence of the Kalman filter after some iterations in which the Kalman Gain G has been modified have been performed, application of the CSC value may be halted if both a null-hypothesis test comparing the estimate q with the previous estimate q' and a null-hypothesis test comparing the uncertainty u_q with the previous uncertainty u_q' are accepts in, for instance, at least two consecutive iterations. In other words, the determination of the Kalman Gain G may continue in a conventional way based on results of consecutive null-hypothesis tests comparing the estimates q, q' and the uncertainties u_q, u_q'.

Alternatively, the optimized Kalman Gain G may be gradually scaled down based on the p-value of each sequence of null-hypothesis tests until it reaches the normative Kalman Gain. For example, the Kalman Gain G may be determined by $$G = \frac{u\_q'}{(u\_q' + u\_qv)} + CSC \cdot (1 - p).$$

Here, p is the p-value of a null-hypothesis test comparing two consecutive estimates of the performance quantity q, q' and/or their uncertainties u_q, u_q'.

Alternatively, the optimized Kalman Gain G may be scaled down based on a predetermined value n. For example, the Kalman Gain G may be determined by $$G = \frac{u\_q'}{(u\_q' + u\_qv)} + CSC \cdot (1 - n).$$

Alternatively or additionally, the information i may be used to determine the sampling interval from which performance parameter values v are sampled and—in form of corresponding performance quality values qv—serve as input to the Kalman filter. In other words, based on the information i, a "restricted window" for sampling data may be determined. For example, based on the information i, the sampling interval may be set to an interval covering a predefined number of performance parameter values v obtained after the change in software and/or hardware occurred.

Figure 4:
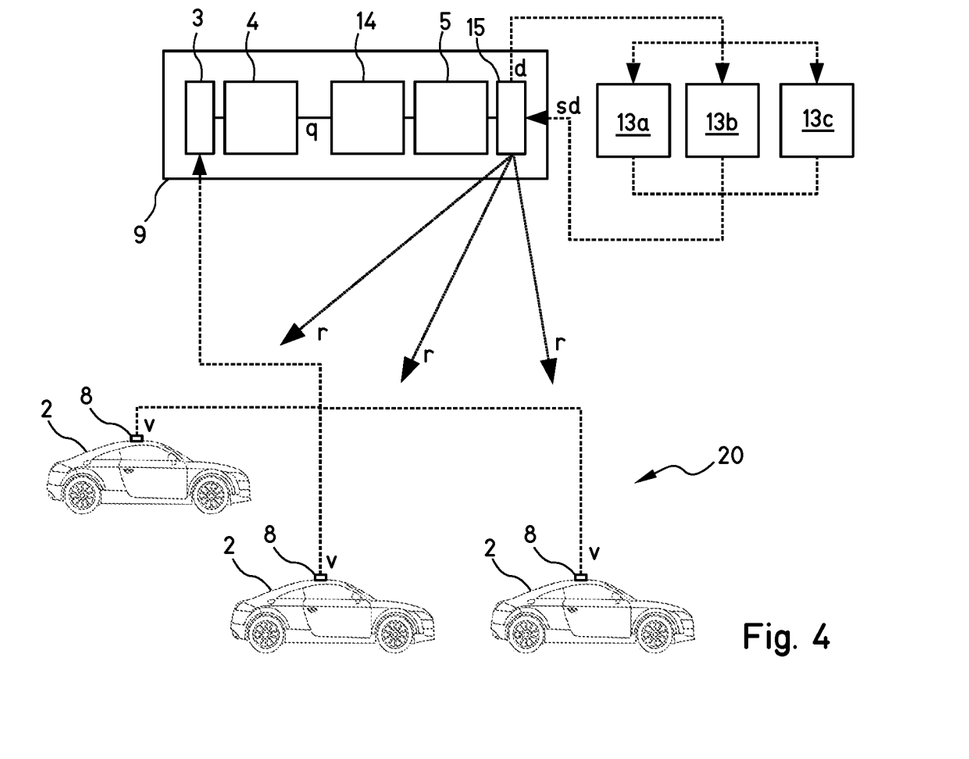
FIG. 4 is a schematic diagram of an exemplary system for adapting operation an operation requirement of autonomous devices of a group of devices.

FIG. 4 shows an example of a system for adapting an operation requirement of autonomous devices 2 of a group 20 of devices, for example vehicles of a vehicle fleet. The system comprises a receiving module 3 for receiving a plurality of performance parameter values v from each of the devices 2, a quantity determining module 4 for determining an individual performance quantity q quantifying the quality of autonomous operation of the respective device 2, a classification module 14 configured for classifying each device 2 of the group 20 based on their respective individual performance quantity q, a change determining module 5 for determining a change of state value for at least one class of devices 2, and an association module 15 configured for determining and associating at least one requirement r for operating the devices 2 of the at least one class of devices 2 with the devices 2 of this class. It is preferred when the receiving module 3, the quantity determining module 4, the classification module 14, the change determining module 5, and the association module 15 are part of a server 9, for example of an autonomous vehicle service provider (AVSP). Alternatively, a part of the system's components may be part of a second server (not shown), for example an intermediary server of an external service provider. In particular, the classification module 14, the change determining module 5 and the association module 15 may be part of such a second server.

Similar to the device shown in FIG. 1 and described above, the devices 2 preferably comprise (i) a control module configured to autonomously control at least a part of the functions of the device 2, (ii) a monitoring module, for example a sensor assembly and/or an electronic control unit (ECU), configured to monitor at least one performance parameter during autonomous or semi-autonomous operation of the device 2, and/or (iii) an interface 8 configured to provide performance parameter values v obtained by monitoring or "measuring", particularly capturing, the at least one performance parameter to the receiving module 3.

The performance parameter values v received by the receiving module 3 may be stored in a data storage module (see FIG. 1). In the present example, however, the received performance parameter values v are fed directly to the quantity determining module 4 for immediate processing, in particular real-time or at least close to real-time processing.

The quantity determining module 4 is configured to determine the performance quantity q for each of the devices 2 based on the obtained performance parameter values v. Based on these individual performance quantities q, the classification module 14 preferably classifies the devices 2. In other words, the classification module 14 is preferably configured to sort the devices 2 into several "clusters" or tranches based on the individual performance quantities q.

The change determining module 5 is preferably configured to determine the change of state value for at least class of devices 2 based on the individual performance quantities q of the devices 2 of this class. Advantageously, the change of state value is indicative and/or representative of a change in autonomous behavior of all vehicles 2 in this class.

Based on the change of state value and/or the individual performance quantities q associated with the at least one class, the association module 15 is advantageously configured to determine at least one requirement r for operating the devices 2 of the at least one group. To this end, the association module 15 is preferably configured to output data d indicative of the performance quantities q and/or the change of state value associated with the at least one class or the vehicles 2 in this class, respectively. For example, the association module 15 could output the average performance quantity or a similar mathematical subsumption for the at least one class.

As shown in FIG. 4, the server 9 may be in communication with a plurality of external service provider servers 13a, 13b, 13c. Advantageously, the association module 15 is configured to send the data d to each of the servers 13a, 13b, 13c. Preferably, the server 9 is further configured to receive, in response to sending the data d, server data sd from each of the servers 13a, 13b, 13c. The servers data sd is preferably indicative of the at least one operational requirement r associated with operation of the autonomous devices 2 of the at least one class of devices 2 from the plurality of servers 13a, 13b, 13c.

The server data sd is preferably received by the association module 15 for associating the at least one operation requirement r with the devices 2 of the at least one class. To this end, the association module 15 may be configured to compare the server data sd received from different servers 13a, 13b, 13c. Based on this comparison, the operation requirement(s) r may be attributed to the devices 2.

For example, the different external servers 13a, 13b, 13c may be run by maintenance providers. Accordingly, the server data sd advantageously corresponds to maintenance scheduling for all devices 2 having a particular (e.g. averaged) performance quantity q. Based on the comparison of the server data sd, the association module 15 may associate with the devices 2 of the respective class the most effective maintenance schedule, i.e., where maintenance intervals are longest.

In another example, the different external servers 13a, 13b, 13c may be run by spare part providers. Accordingly, the server data sd advantageously corresponds to spare part availability. Based on the comparison of the server data sd, the association module 15 may associate with the devices 2 of the respective class a spare part storage having the highest spare part availability.

In yet another example, the different external servers 13a, 13b, 13c may be run by insurance providers. Accordingly, the server data sd advantageously corresponds to insurance premiums. Based on the comparison of the server data sd, the association module 15 may associate with devices 2 of the respective class the most cost efficient premium.

Figure 5:
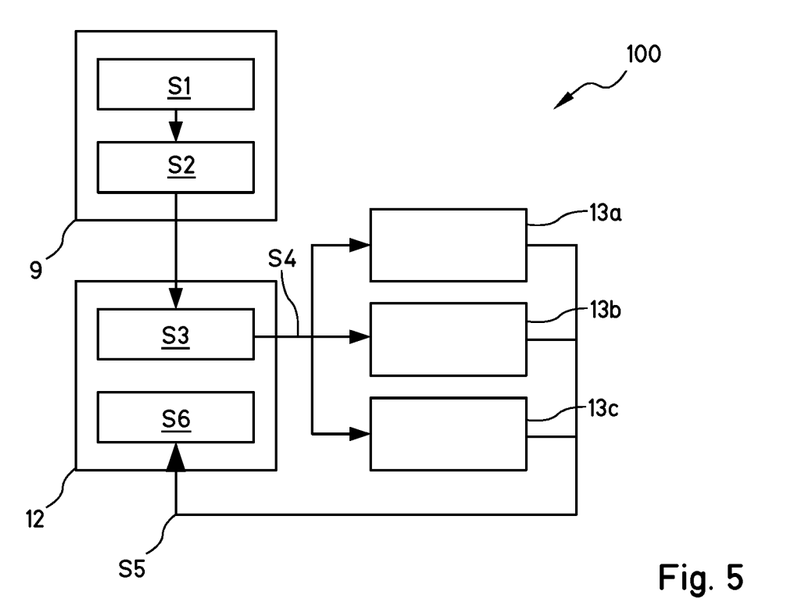
FIG. 5 is a flow chart of an exemplary method for determining a change of state of an autonomous device.

FIG. 5 shows an example of a method 100 for determining a change of state of an autonomous device. In a method step S1, a plurality of performance parameter values obtained by monitoring at least one performance parameter during autonomous operation of the device is received. Based on the obtained performance parameter values and information associated with a flux of software and/or hardware related to autonomous operation of the device, a performance quantity quantifying the quality of autonomous operation of the device is determined in a method step S2. In a method step S3, a change of state value for the device is determined based on the performance quantity.

Preferably, steps S1 and S2 are performed on a server 9, which may be associated with an autonomous vehicle service provider (AVSP) in case the device is an autonomous vehicle. The AVSP may use monitoring modules in autonomous vehicles of his vehicle fleet to obtain the performance parameter values and provide them at the server 9 (cf. FIG. 1).

Optionally, method steps S1 and S2 may be—preferably simultaneously—performed for a plurality of devices of a group of devices, for instance for a plurality of vehicles of the vehicle fleet of the AVSP. In this case, in method step S3, alternatively or additionally to the determination of the change of state value, the plurality of devices is classified based on the determined individual performance quantities.

The change of state value may be determined by an external service provider, e.g. a maintenance service provider or an insurance broker. To this end, the determined performance quantity may be provided at an intermediary server 12, which advantageously comprises a change determining module (cf. FIG. 1). On the intermediary server 12, the determined performance quantity may, for example, be compared to previously determined performance quantities in order to derive the change of state value.

Preferably, in an optional method step S4, the change of state value and/or the performance quantity determined in step S2 is or are, respectively, output if the change of state value reaches and/or exceeds a predefined threshold. For example, the change of state value and/or the performance quantity may be output if the change of state value is indicative of a significant or at least measurable change in the behavior of the autonomous device caused by the flux of software and/or hardware. If a plurality of devices has been classified or "clustered" in method step S4, data indicative of the performance quantity of individual devices of at least one class can be output.

Preferably, outputting the change of state value and/or the performance quantity, in particular the data indicative of the performance quantity representative for the at least one class, comprises sending the same to a plurality of external servers 13a, 13b, 13c. These external servers 13a, 13b, 13c may be associated with a respective further external service provider, for example a supplier of component parts or software code, or an insurer. The further external service providers can, based on the transmitted performance quantity and/or the change of state value, determine operational requirements, in particular changes in operational requirements, associated with operation of the autonomous device. Such operational requirement could, for example, relate to the repair or replacement of component parts of the device. For example, the maintenance service provider can determine, based on the performance quantity and/or the change of state value, that a further modification of the device is necessary in order to complement the behavioral change.

Alternatively or additionally, the supplier could determine that strengthening a particular supporting component part of the device is necessary in order to meet increased load on this parts associated with the behavioral change.

In another example, such operational requirement could relate to an insurance premium rate. For example, the insurer can determine, based on the performance quantity and/or the change of state value, that an insurance premium may be lowered due to the changes to the device control software (also termed AI) that may have been given development priority based on overhead savings including insurance costs.

In a further optional method step S5, server data indicative of this operational requirement is provided by the external servers 13a, 13b, 13c and received by the intermediary server 12. In a further optional method step S6, the intermediary server 12 may test which of the server data fulfils a predetermined criterion. Based on the result of the test, server data received from one of the external server 13a, 13b, 13c may be chosen and associated with operation of the device or devices from the at least one class, respectively.

For example, the external maintenance service provider may assess suggestions of its suppliers for repair and/or replacement of component parts of the device and follow the suggestion which promises the longest service life of the device, or which indicates the lowest cost for the user/provider of the device. In another example, the insurance broker may choose from offers of the insurers, particularly with respect to the highest economic value.

A method for adapting an operation requirement of an autonomous vehicle may comprise method steps S1, S2 S3, S4 and S5. In particular, said method may comprise (i) receiving a plurality of performance parameter values obtained by monitoring at least one performance parameter during autonomous operation of a device; (ii) determining a performance quantity quantifying the quality of autonomous operation of the device based on the obtained performance parameter values; (iii) determining a change of state value for the device based on the performance quantity; (iv) determining at least one requirement for operating the device based on the change of state value and/or the performance quantity and associating said operating requirement with the device.

In a preferred embodiment of this method, the change of state value is compared to a threshold and, depending on a result of the comparison, the driving quantity and/or the change of state value is output (S4).

In another preferred embodiment of this method, depending on a result of the comparison, the performance quantity and/or the change of state value is sent to a plurality of external servers 13a, 13b, 13c and in return to sending the performance quantity and/or the change of state value, server data indicative of an operational requirement associated with operation of the autonomous device is received (S5) from each of the servers (13a, 13b, 13c).

In yet another preferred embodiment of this method, a test is performed (S6) which of the server data fulfill a predetermined criterion, and, based on the result of the test, server data is chosen and associated with the device and/or operation of the device, respectively.

In yet another preferred embodiment of this method, the change of state value and/or performance quantity is re-sent to the plurality of servers based on a result of the comparison of the server data or the testing, respectively.

In yet another preferred embodiment of this method, the change of state value and/or performance quantity is output periodically.

In yet another preferred embodiment, the change of state value and/or performance quantity is output a predetermined amount of time after a flux in software and/or hardware associated with autonomous operation of the device occurred.

In yet another embodiment this method comprises: (i) for each device of a group, receiving a plurality of performance parameter values obtained by monitoring at least one performance parameter during autonomous operation of the respective device; (ii) for each device of the group, determining an individual performance quantity quantifying the quality of autonomous operation of the respective device based on the received performance parameter values; (iii) classifying all devices based on the individual performance quantities; (iv) determining a change of state value for at least one class of devices based on the individual performance quantities of devices in this class; (v) determining at least one requirement for operating the devices of the at least one class based on the individual performance quantities of the devices in this class and/or the change of state value determined for this class; and (vi) associating the at least one operation requirement with all devices of the at least one class.

The following is a summary list of reference numerals and the corresponding structure used in the above description of the invention:

1 system
2 device
3 receiving module
4 quantity determining module
5 change determining module
6 control module
7 monitoring module
8 interface
9 server
10 data storage
11 AVSP server
12 intermediary server
13a-13c external service provider server
14 classification module
15 association module
20 group of devices
100 method
q performance quantity
u_q uncertainty of the performance quantity
q' previous performance quantity
u_q' uncertainty of the previous performance quantity
v performance parameter value
qv performance quality value
u_qv uncertainty of the performance quality value
i information
su software update
G Kalman Gain
r operation requirement
d data indicative of performance quantities
sd server data
C1-C3 computation steps
S1-S6 method steps

The invention claimed is:

1. A method for adapting an operation of an autonomous vehicle, the method comprising:
   receiving a plurality of performance parameter values obtained by monitoring at least one performance parameter during an autonomous driving of the autonomous vehicle, wherein the performance parameter is a variable characterizing at least a part of the autonomous driving of the autonomous vehicle, and wherein the performance parameter is selected from the group comprising: a speed, an acceleration/deceleration, a current position of the vehicle, a steering wheel angle, a pedal usage, traffic patterns, a situational awareness, a response to dynamic and stationary objects on or adjacent to a thoroughfare, and a value associated with a transfer of control from a vehicle AI to a human driver;
   determining a performance quantity quantifying a quality of the autonomous driving of the vehicle based on the performance parameter values and information associated with a change in an autonomous vehicle driving software, a hardware related to autonomous driving of the autonomous vehicle, or both the autonomous vehicle driving software and the hardware related to autonomous driving of the autonomous vehicle, wherein the performance quantity is a quantity based on a mathematical subsumption of the performance parameter values allowing a quantitative comparison to a previous driving behavior of the autonomous vehicle, wherein the change in the autonomous vehicle driving software, the hardware related to autonomous driving of the autonomous vehicle, or both the autonomous vehicle driving software and the hardware related to autonomous driving of the autonomous vehicle affects a performance of autonomously controlled actions and/or a condition of the autonomous vehicle or at least components thereof;
   determining a change of state value for the autonomous vehicle based on a comparison of the performance quantity with a previously determined performance quantity, wherein the change of state value characterizes an effect of a change in the autonomous vehicle driving software, the hardware, or both the autonomous vehicle driving software and the hardware on an autonomous driving behavior of the vehicle; and
   based on at least one parameter selected from the group consisting of the change of state value and the performance quantity, adjusting at least one feature selected from the group consisting of: the autonomous vehicle driving software, the hardware related to autonomous driving of the vehicle, and a mission parameter of the vehicle.

2. The method according to claim 1, which comprises determining the change of state value by comparing the performance quantity determined in the determining step with a previously determined performance quantity.

3. The method according to claim 1, wherein the step of determining the performance quantity comprises estimating the performance quantity based on a limited number of performance parameter values obtained since a change occurred in the autonomous vehicle driving software, the hardware related to autonomous driving of the autonomous vehicle, or both the autonomous vehicle driving software and the hardware related to autonomous driving of the autonomous vehicle.

4. The method according to claim 1, wherein a performance quality value is obtained based on the plurality of received performance parameter values, and the step of determining the performance quantity is based on filtering a plurality of successively obtained performance quality values.

5. The method according to claim 1, wherein the step of determining the performance quantity comprises Kalman filtering of successive performance quality values, each derived from a plurality of performance parameter values.

6. The method according to claim 1, which comprises determining a Kalman Gain for recursively calculating an estimate of the performance quantity based on information associated with the change in the autonomous vehicle driving software, the hardware related to autonomous driving of the autonomous vehicle, or both the autonomous vehicle driving software and the hardware related to autonomous driving of the autonomous vehicle.

7. The method according to claim 6, which comprises, based on the information associated with the change in the autonomous vehicle driving software, the hardware related to autonomous driving of the autonomous vehicle, or both the autonomous vehicle driving software and the hardware related to autonomous driving of the autonomous vehicle, increasing a normative Kalman Gain by a predetermined amount.

8. The method according to claim 6, wherein the information associated with the change in the autonomous vehicle driving software, the hardware related to autonomous driving of the autonomous vehicle, or both the autonomous vehicle driving software and the hardware related to autonomous driving of the autonomous vehicle comprises information on a type of code module or hardware module in which a code change is present or which is changed, respectively.

9. The method according to claim 6, which comprises increasing the Kalman Gain by a first amount for code changes and by a second amount for hardware or firmware changes, wherein the second amount is different from the first amount.

10. The method according to claim 9, which comprises scaling an increased Kalman Gain up or down in at least two successive determinations of the Kalman Gain in a predefined manner.

11. The method according to claim 10, wherein a scaling up or down of the increased Kalman Gain depends on a number of code modules and/or hardware modules in which the code change is present or which is changed, respectively.

12. The method according to claim 11, wherein the scaling up or down of the increased Kalman Gain depends on a p-value of a null-hypothesis test comparing successive estimates for the performance quantity.

13. The method according to claim 10, wherein the scaling up or down of the increased Kalman Gain depends on a p-value of a null-hypothesis test comparing successive estimates for the performance quantity.

14. The method according to claim 6, which comprises modifying the Kalman Gain based on a result of a null-hypothesis test comparing successive estimations for the performance quantity and/or associated uncertainties.

15. The method according to claim 1, wherein an accident risk is associated with the determined performance quantity.

16. The method according to claim 1, which comprises determining a change of state of an autonomous vehicle.

17. A method of adapting a requirement for an operation of an autonomous vehicle, the method comprising:
receiving a plurality of performance parameter values obtained by monitoring at least one performance parameter during an autonomous driving of the autonomous vehicle, wherein the performance parameter is a physical variable characterizing at least a part of a driving of the autonomous vehicle, and wherein the performance parameter is selected from the group comprising: a speed, an acceleration/deceleration, a current position of the vehicle, a steering wheel angle, a pedal usage, traffic patterns, a situational awareness, a response to dynamic and stationary objects on or adjacent to a thoroughfare, and a value associated with a transfer of control from a vehicle AI to a human driver;
determining a performance quantity quantifying a quality of the autonomous driving of the autonomous vehicle based on the performance parameter values, wherein the performance quantity is a quantity based on a mathematical subsumption of the performance parameter values allowing a quantitative comparison of a driving behavior of the autonomous vehicle to at least one driving feature selected from the group consisting of: a previous driving behavior of the autonomous vehicle, a driving behavior of other autonomous vehicles, a driving behavior of other semi-autonomously operated vehicles, and a driving of manually operated vehicles, wherein the change in the autonomous vehicle driving software, the hardware related to autonomous driving of the autonomous vehicle, or both the autonomous vehicle driving software and the hardware related to autonomous driving of the autonomous vehicle affects a performance of autonomously controlled actions and/or a condition of the autonomous vehicle or at least components thereof;
determining a change of state value associated with an accident risk for the autonomous vehicle by comparing the performance quantity with a previously determined performance quantity, wherein the change of state value indicates whether a change has occurred in the driving behavior of the autonomous vehicle;
comparing the accident risk associated with the change of state value to a threshold and, depending on a result of the comparison, sending the accident risk to a plurality of servers;
in return to sending the accident risk to the plurality of servers, receiving server data from the plurality of servers, the server data being based on the accident risk and indicative of at least one parameter defining a usage of the autonomous vehicle;
determining at least one parameter for operating the autonomous vehicle by comparing the server data received from different ones of the plurality of servers with each other and choosing the server data from one of the plurality of servers; and
performing at least one step selected from the group consisting of operating the autonomous vehicle based on the at least one parameter for operating the autonomous vehicle and maintaining the autonomous vehicle based on the at least one parameter for operating the autonomous vehicle.

18. A system for adapting an autonomous driving of an autonomous vehicle, the system comprising:
a receiving module configured for receiving a plurality of performance parameter values obtained by monitoring at least one performance parameter during the autonomous driving of the autonomous vehicle, wherein the performance parameter is a variable characterizing at least a part of the autonomous driving of the autonomous vehicle, and wherein the performance parameter is selected from the group comprising: a speed, an acceleration/deceleration, a current position of the vehicle, a steering wheel angle, a pedal usage, traffic patterns, a situational awareness, a response to dynamic and stationary objects on or adjacent to a thoroughfare, and a value associated with a transfer of control from a vehicle AI to a human driver;
a quantity determining module configured for determining a performance quantity quantifying a quality of the autonomous driving of the autonomous vehicle based on the performance parameter values and information associated with a change in an autonomous vehicle driving software, a hardware related to autonomous driving of the autonomous vehicle, or both the autonomous vehicle driving software and the hardware related to autonomous driving of the autonomous vehicle, wherein the performance quantity is a quantity based on a mathematical subsumption of the performance parameter values allowing a quantitative comparison to a previous driving behavior of the autonomous vehicle, wherein the change in the autonomous vehicle driving software, the hardware related to autonomous driving of the autonomous vehicle, or both the autonomous vehicle driving software and the hardware related to autonomous driving of the autonomous vehicle affects a performance of autonomously controlled actions and/or a condition of the autonomous vehicle or at least components thereof; and a change determining module configured for determining a change of state value for the autonomous vehicle based on a comparison of the performance quantity with a previously determined performance quantity, wherein the change of state value characterizes an effect of a change in the autonomous vehicle driving software, the hardware, or both the autonomous vehicle driving software and the hardware on an autonomous driving behavior of the vehicle.

19. The system according to claim 18, configured for determining a change of state of the autonomous vehicle.

* * * * *